March 24, 1953 K. F. NYSTROM ET AL 2,632,406
RAILROAD CAR TRUCK EQUALIZER CONTROL MEANS
Filed Nov. 18, 1948 2 SHEETS—SHEET 1

Inventors:
Karl F. Nystrom,
Vernon L. Green and
Joseph J. Drinka
By:— George Heidman
Atty.

March 24, 1953  K. F. NYSTROM ET AL  2,632,406
RAILROAD CAR TRUCK EQUALIZER CONTROL MEANS
Filed Nov. 18, 1948  2 SHEETS—SHEET 2

Inventors:
Karl F. Nystrom,
Vernon L. Green and
Joseph J. Drinka.
By— George Heidman
Atty.

Patented Mar. 24, 1953

2,632,406

UNITED STATES PATENT OFFICE 2,632,406

RAILROAD CAR TRUCK EQUALIZER CONTROL MEANS

Karl F. Nystrom, Nashotah, and Vernon L. Green and Joseph J. Drinka, Milwaukee, Wis.

Application November 18, 1948, Serial No. 60,802

1 Claim. (Cl. 105—194)

Our invention relates to mechanism whereby the relative lateral forces between the equalizers of a railroad car truck and the truck frame may be controlled and metal-to-metal contact between the equalizers and truck side frame members prevented; mechanism which at the same time permits the desired amount of relative vertical movement between the equalizers and the truck frame without materially affecting the vertical action of the equalizer springs.

The objects and advantages of our invention will be readily comprehended from the detailed description of the accompanying drawings wherein—

Figure 1:
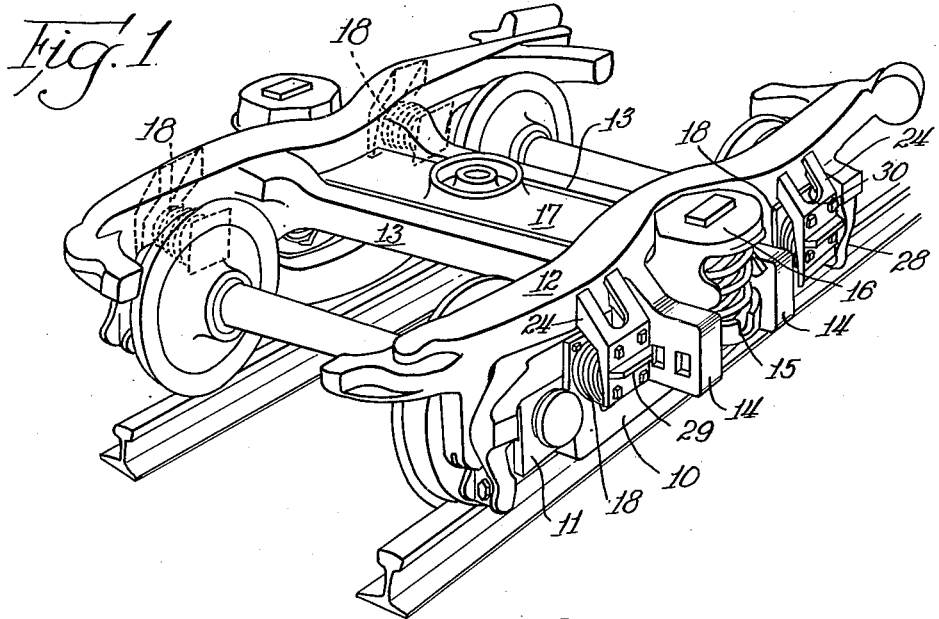
Figure 1 is a perspective view of a railroad car truck with our invention applied thereto; certain truck elements being omitted for clarity.

In the particular exemplifications, our invention is shown applied to a pedestalless type of truck frame wherein the equalizers 10 are provided with downwardly disposed yokes to receive the roller bearing housings 11. The truck side frames 12 at opposite sides of the truck are tied to each other by the usual transom members 13, 13, whose ends, in this instance, are integral with and extend beneath the side frames, as shown at 14, 14, to provide means for supporting the spring or springs 15 whose upper ends seat in the inverted cup portions 16 which constitute the ends of the truck bolster 17.

Our improved stabilizing or control means comprises a suitable number of rubber sandwiches 18 which are operatively associated with the truck side frame members and the associated equalizers.

Each sandwich 18 is composed of a suitable number of steel or rigid plates 19 of preselected size and thickness and preferably circular as shown, spaced apart by resilient elements or rubber pads 20, of predetermined characteristics, size and thickness. The plates 19 and the rubber pads 20 are bonded or intimately secured together into single units or sandwiches whose outer end faces consist of the preferably rectangular end plates 21, 21, whose marginal portions or corners extend beyond the perimeter of the body of the sandwich and are provided with bolt receiving apertures at 22, as more clearly disclosed in Figure 4.

Figure 2:
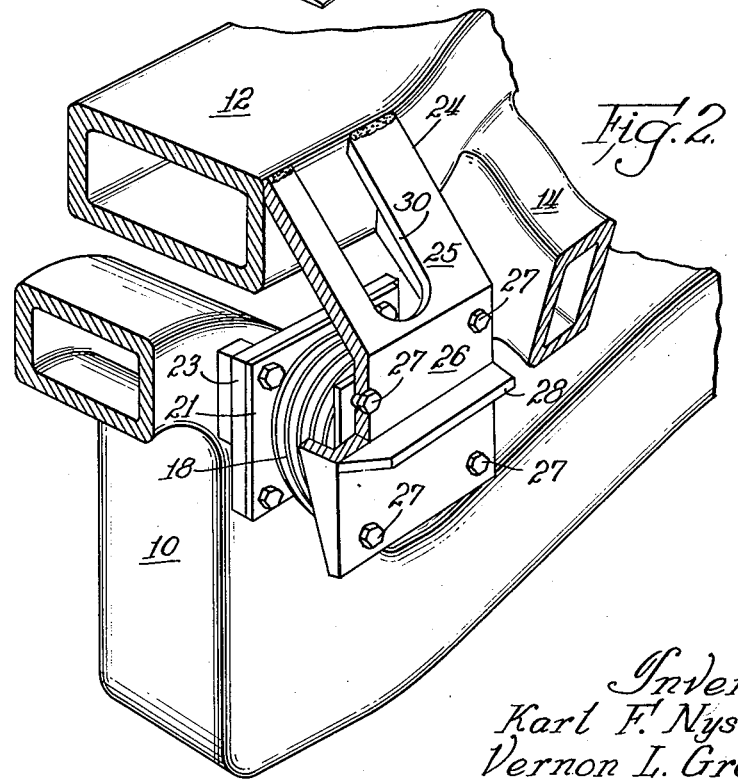
Figure 2 illustrates, on a larger scale and in perspective, a portion of the truck side frame and of an equalizer with our improved means applied in the manner shown in Figure 1.

The equalizers 10, in the exemplification shown in Figures 1 and 2, intermediate the upwardly disposed inner legs of the journal bearing receiving yokes and the adjacent outwardly extending side frame and transom extensions 14, are provided with suitable brackets or plates 23, which are welded or intimately and non-movably secured to the equalizers. The inner end plate 21 of the sandwich 18 is bolted or otherwise rigidly secured to the bracket-plate 23 as shown in the drawings.

Intimately secured to the outer side of the truck side frame 12, coincident with each sandwich 18 secured to the equalizer, is a hood-like bracket 24 comprising the downwardly and outwardly sloping portion 25 which terminates in the vertical side portion 26. The upper end of the sloping portion 25 preferably is welded to the side frame, while the vertical portion 26 is provided with apertures adapted to register with the openings 22, in the outer end plate 21 of the sandwich, to receive bolts 27, see Figures 2 and 4.

The end plates 21 of the sandwich and the bracket members are firmly secured or bolted together so that no sliding movement between the sandwich, the equalizer and/or truck frame may occur. The sandwiches are disposed horizontally parallel with the direction of the lateral forces between the equalizer and the truck frame. The sandwiches preferably are installed under a predetermined amount of compression — although they might be operatively effective without being under compression.

The vertical side of bracket 24 is shown provided with a ledge or flange 28, disposed transversely of the median line of the sandwich (see Figure 2) to provide means for attaching a jack or tool whereby the sandwich may be placed under and held under compression while the sandwich is being installed.

Figure 3:
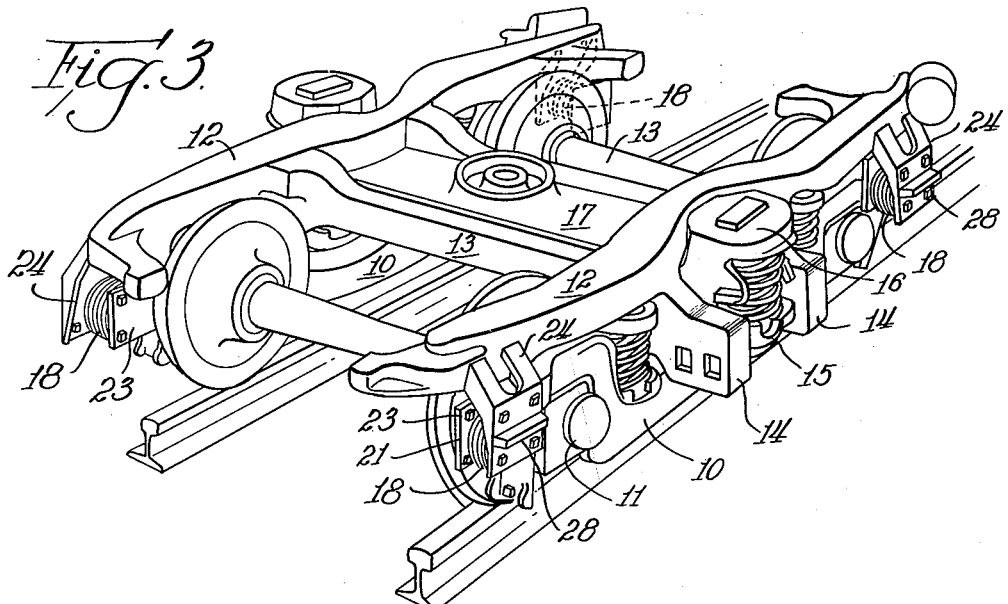
Figure 3 is a perspective view similar to that shown in Figure 1, illustrating a modified application.

In Figure 3 we show a modification of application, namely with the control means or sandwiches applied adjacent the ends of the truck frame and the equalizers. That is to say, the sandwiches are secured farther removed from the transverse median line of the truck and offer greater resistance to any relative twisting movements between the equalizers and the truck frame.

Figure 4:
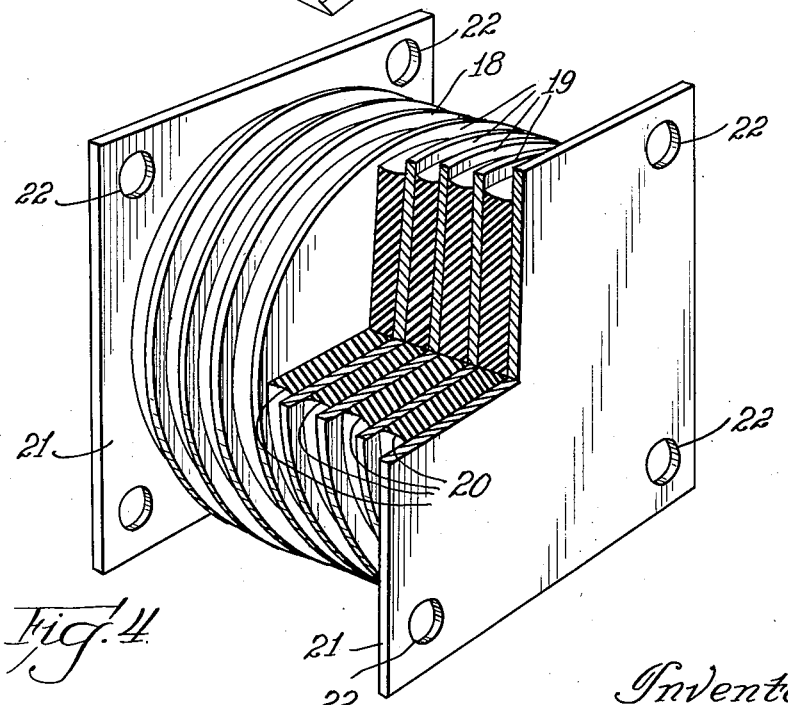
Figure 4 is a perspective view, on a larger scale, of our improved control means with a portion broken away and in section to disclose construction.

The stabilizing means of Figure 3 is of the same construction as heretofore described and shown in Figures 2 and 4; and as previously stated preferably are placed under a predetermined and substantially equal amount of compression.

As is apparent from the construction shown, the lateral forces between the equalizers and the truck frame will be absorbed or taken and resisted by compression of the sandwich, while the relative vertical movement between the equalizers and the truck frame will be taken care of by placing the rubber of the sandwiches in shear.

The principal idea of the invention is to endeavor to control the relative lateral movement without appreciably affecting the vertical action of the equalizer springs.

The lateral movement control tie means may be arranged either adjacent the ends of the truck as shown in Figure 3, or at points intermediate the vertical planes of the truck journal boxes and of the truck frame transom members, as shown in Figure 1, or at any convenient point substantially parallel with the transverse or lateral forces that may be set up between the truck frame and the equalizers; and in order to permit inspection of the rubber sandwiches the sloping upper portion 25 of the truck frame brackets are shown provided with enlarged openings as at 39, see Figure 2—this opening, when the tie means are located as in Figure 1, also permitting inspection of the usual equalizer springs which support the truck frame.

We have shown and described what we believe to be the simplest and most efficient forms of our invention, but structural modifications and arrangements, as well as application to a different style of truck, are possible without, however, departing from the spirit of our invention as defined in the appended claim.

What we claim is:

In a railway car truck provided with a pedestalless type truck frame with equalizers extending lengthwise of the truck and the load carrying frame which is spring supported on the equalizers and arranged parallel with the equalizers; vertically disposed flat bracket plates secured to the outer vertical faces of the equalizers; hood-like brackets pendently secured to the outer faces of the side frames and terminating in vertical lower portions arranged outward of and in parallel spaced relation with the bracket plates on the equalizers, said brackets and bracket plates being immovably secured in place adjacent the supporting wheels of the truck; and rubber sandwiches arranged vertically between and removably secured to said brackets and bracket plates and disposed outwardly of the side frames and equalizers and arranged under initial compression and each consisting of a plurality of vertically disposed large, thick rubber pads and alternate flat and rigid metal plates, and outer metal plates extending beyond the perimeter of the body of the sandwich and provided with bolt-receiving apertures to receive bolts for removably securing the sandwich to said bracket plates and said brackets, all bonded or intimately secured together and arranged transversely of the direction of the lateral forces between the side frame and equalizers to cushioningly absorb the forces of compression and thereby control the transverse movements between the equalizers and side frame, while permitting a predetermined degree of vertical movement therebetween.

KARL F. NYSTROM.
VERNON L. GREEN.
JOSEPH J. DRINKA.

REFERENCES CITED

The following references are of record in the file of this patent:

UNITED STATES PATENTS

| Number | Name | Date |
|---|---|---|
| 694,346 | Best | Mar. 4, 1902 |
| 2,138,449 | Hallquist | Nov. 29, 1938 |
| 2,323,348 | Nystrom et al. | July 6, 1943 |
| 2,347,362 | Nystrom et al. | Apr. 25, 1944 |